(12) United States Patent
Kim et al.

(10) Patent No.: US 6,384,885 B1
(45) Date of Patent: May 7, 2002

(54) REFLECTIVE-TYPE LIQUID CRYSTAL DISPLAY DEVICE AND REFLECTING SUBSTRATE THEREOF

(75) Inventors: Yong Beom Kim, Kunpo; Woo Hyun Kim, Seoul; Hyun Ho Son, Kyungju, all of (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/311,705

(22) Filed: May 13, 1999

(30) Foreign Application Priority Data

May 15, 1998 (KR) .............................. 98-17590

(51) Int. Cl.[7] .......................................... G02F 1/1335
(52) U.S. Cl. ...................... 349/113; 349/119; 349/128; 349/138
(58) Field of Search ................................ 349/113, 117, 349/102, 128, 119, 138, 123, 132; 359/599, 613

(56) References Cited

U.S. PATENT DOCUMENTS 5,204,765 A * 4/1993 Mitsui et al. ............... 349/113
6,097,458 A * 8/2000 Tsuda et al. ................ 349/113

* cited by examiner

Primary Examiner—Kenneth Parker
Assistant Examiner—Tai V. Duong
(74) Attorney, Agent, or Firm—Long Aldridge & Norman LLP

(57) ABSTRACT

A reflective-type liquid crystal display device is disclosed which comprises first and second substrates; a metal layer having a convex-concave surface over the insulating layer; a $\lambda/4$ phase retardation optical film over the second substrate. The convex portion of the metal has a long width in a first direction perpendicular to the main viewing angle direction of the user. Polarization direction of the polarizer is at 90° with respect to the first direction, and slow axis of the optical film is at 45° with respect to the polarization direction. This reflective-type LCD has a high reflective luminance in the main viewing angle direction. Further, because TE(transverse electric) polarized light is incident on the metal transverse electric, the reflective luminance is much more improved.

20 Claims, 9 Drawing Sheets

REFLECTIVE-TYPE LIQUID CRYSTAL DISPLAY DEVICE AND REFLECTING SUBSTRATE THEREOF

The present invention relates to a reflective-type liquid crystal display device and a reflecting substrate thereof, and more particularly to the reflective-type liquid crystal display and the reflecting substrate having an improved reflective luminance in the main viewing angle directions of the user.

A liquid crystal display device (LCD) has been widely used for a display device of a portable television and a notebook computer. The liquid crystal display device is classified into two types: a transmitting-type liquid crystal display device using a backlight as a light source; and a reflective-type liquid crystal display device using an external light source such as sunlight and an indoor lamp. It is hard to decrease the weight, volume, and the power consumption of the transmitting-type LCD because of the backlight. Accordingly, a great deal of research has been done regarding the reflective-type LCD.

Conventionally, the reflective-type LCD uses a reflecting substrate having an uneven reflecting surface to enlarge the viewing angle of the user. FIG. 1a is a plane view showing the conventional reflective-type LCD, and FIG. 1b is a sectional view taken along line I–I'. As shown in the figures, the reflective-type LCD comprises a substrate 1, round bumps 2 on the substrate 1, and an overcoat layer 3 over the round bumps 2, and a metal layer on the overcoat layer 4.

The reflective-type LCD is manufactured by the following processes. First, a photoresist layer is formed on the substrate 1, and UV light is irradiated into the photoresist layer with a mask blocking the photoresist and having holes in the same plane form as the round bumps 2 as shown in FIGS. 1a and 1b. Thereafter, the photoresist layer is developed and heat-treated to form the round bumps 2 on the substrate 1. Continually, the overcoat layer 3 is coated on the round bumps 2 to obtain a continuous convex-concave surface. Finally, the metal layer 4 is formed thereon by sputtering metal such as Al, Mo, and Al alloys. The metal layer 4 has a continuous convex-concave surface as the overcoat layer 3, and functions as reflecting and scattering the incident light into various directions. Accordingly, an LCD using the conventional reflecting substrate has a wide viewing angle of the user.

However, a large amount of light reflects except in the main viewing angle direction of the user, so that the reflectivity is very low in the main viewing angle direction. Further. as shown in FIG. 6a, the plane of incidence does not match with the plane of reflection at the side of the convex surface, and thereby the polarization direction is changed to cause the wrong operation of the device. Dotted lines in this figure represent the polarization directions. Furthermore, two forming steps of the round bumps and the overcoat are required to obtain the continuous convex-concave surface, thereby complicating the manufacturing process.

SUMMARY OF THE INVENTION

An object of the present invention is to provide a reflective-type liquid crystal display device and a reflecting substrate thereof having an improved reflective luminance in the main viewing angle direction.

In order to achieve the object, the reflecting substrate according to the present invention comprises: a substrate parallel to first and second directions perpendicular to each other; an insulating layer having a convex-concave surface over the substrate, a convex portion thereof having a first width in the first direction and a second width in the second direction, the first outline having first and second width perpendicular to each other, the first width being larger than the second width, the convex portion having a straight outline in a plane perpendicular to the substrate and parallel to the first direction, and the convex portion having a round outline in a plane perpendicular to the substrate and parallel to the second direction; and a metal layer on the convex-concave surface of the convex-concave insulating layer.

In order to achieve the object, a reflective-type liquid crystal display device according to the present invention comprises: first and second substrates parallel to first and second directions perpendicular to each other; an insulating layer having a convex-concave surface over the first substrate, a convex portion thereof having a first width in the first direction and a second width in the second directions, the first outline having a first and second width perpendicular to each other, the first width being larger than the second width, and the convex portion having a round outline in a plane perpendicular to the first substrate and parallel to the second direction; a metal layer on the convex-concave surface of the insulating layer; a first alignment layer over the metal layer and having a first alignment direction; a polarizer over the second substrate and having a polarization direction parallel to the second direction; an optical film for phase retardation of light over the second substrate, the optical film being at a position between the polarizer and the first substrate; a second alignment layer over the second substrate and having a second alignment direction; and a liquid crystal layer between the first and second alignment layers.

When light is incident to the metal layer, a large amount of light reflects into the main viewing angle direction by the inventive shape of the convex-concave surface which the metal layer has.

It is preferable that the polarization direction is at 90° with respect to the first direction, and slow axis of the optical film is at 45° with respect to the polarization direction. In this case, TE(transverse electric) mode light is incident on the metal layer, so that the reflectance is much more improved. Further, because the incidence plane is match with the reflectance plane on the metal layer, the polarization of the light is not changed after it is reflected on the metal layer.

BRIEF DESCRIPTION OF THE DRAWINGS

FIG. 1b is a sectional view taken along line I–I' of FIG. 1a.

FIGS. 2c and 2d are sectional views taken along line II–II' of FIG. 2a.

FIGS. 2e and 2f are sectional views taken along line III–III' of FIG. 2a.

DETAILED DESCRIPTION OF THE INVENTION

Figure 1A:
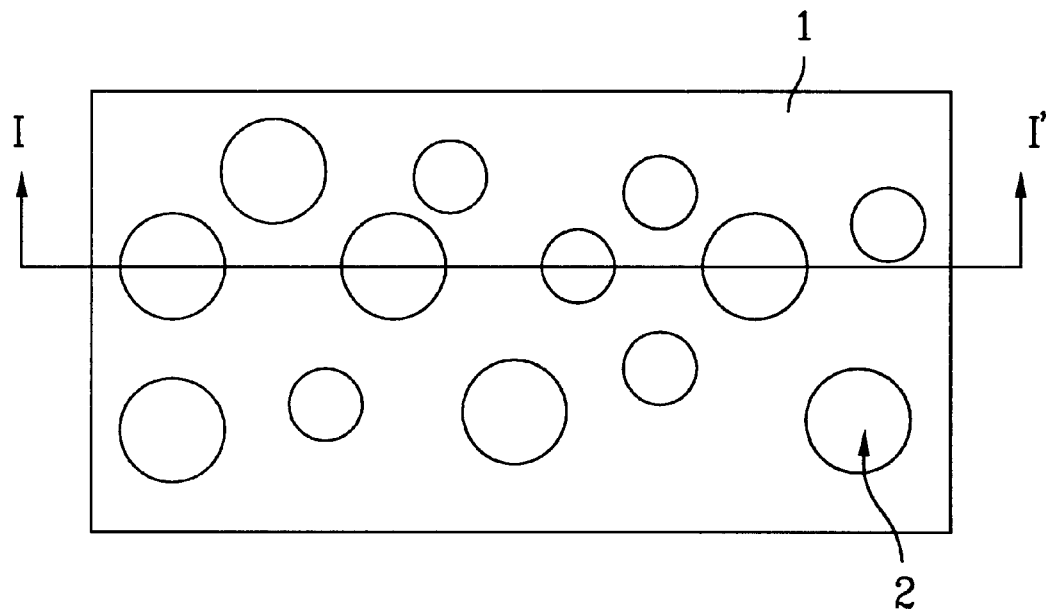
FIG. 1a is a plan view showing a reflecting substrate of a reflective-type LCD of the prior art.
Figure 1B:
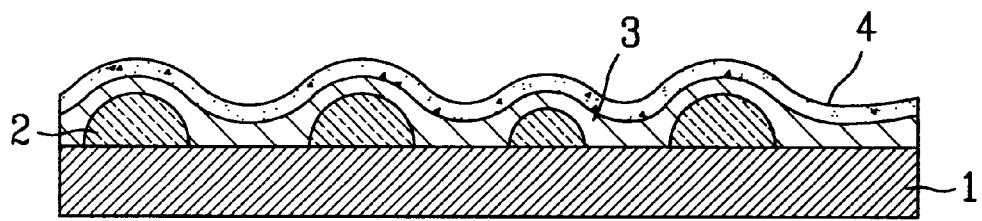

Hereinafter, a reflective-type LCD and a reflecting substrate according to the present invention are described in detail referring to the drawings.

Figure 2A:
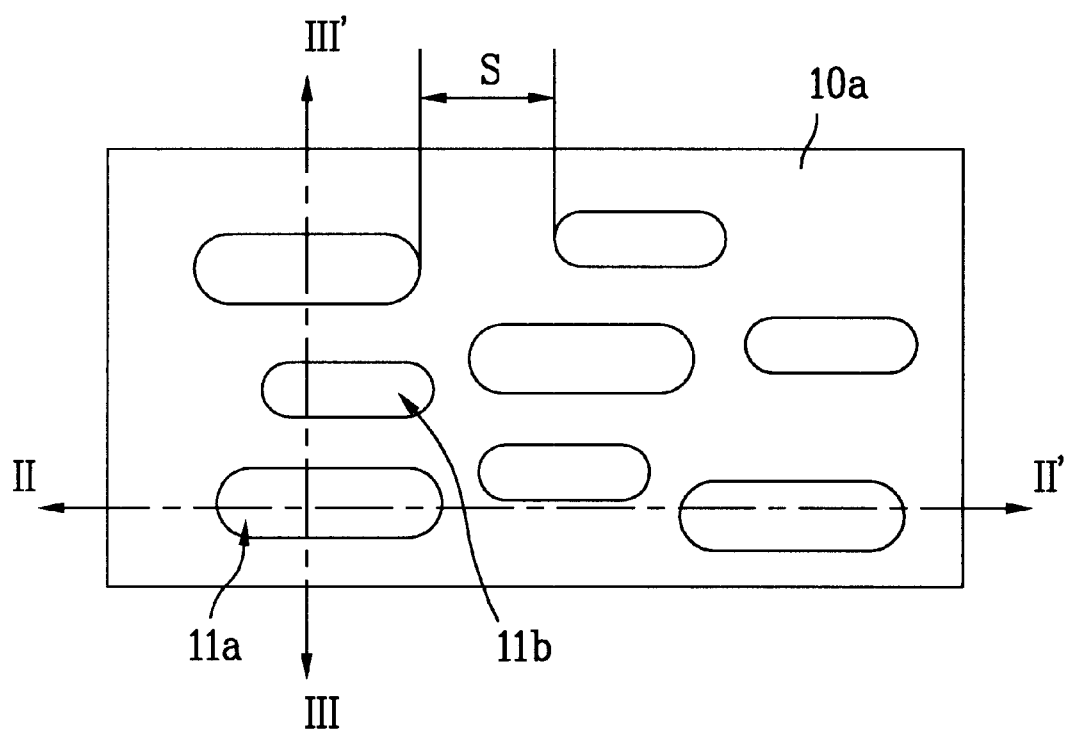
FIGS. 2a and 2b are plan views showing a reflecting substrate of a reflective-type LCD according to the present invention.
Figure 2B:
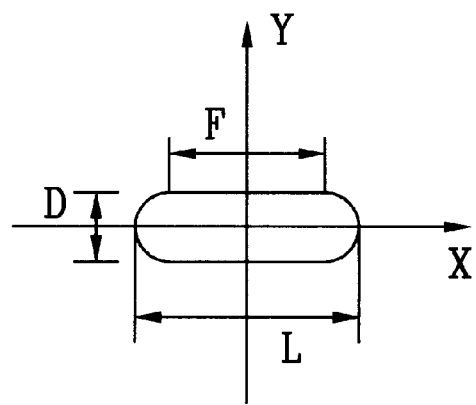
Figure 2C:
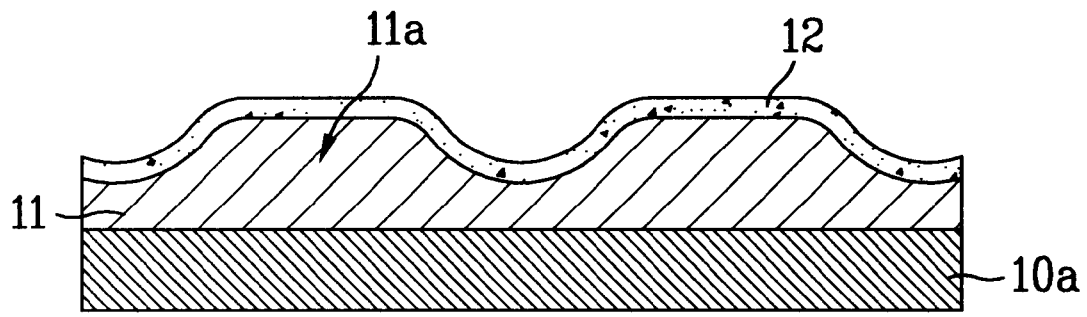
Figure 2D:
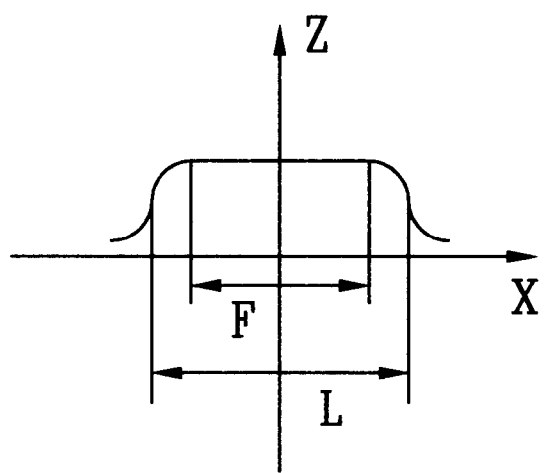
Figure 2E:
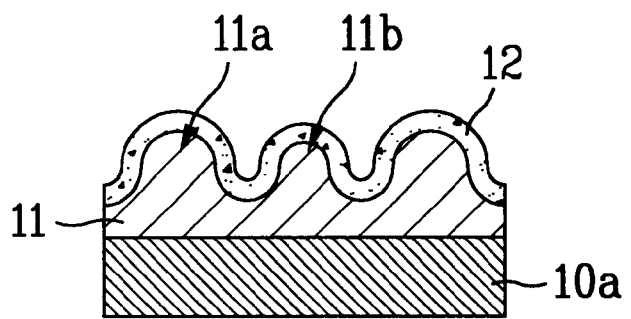
Figure 2F:
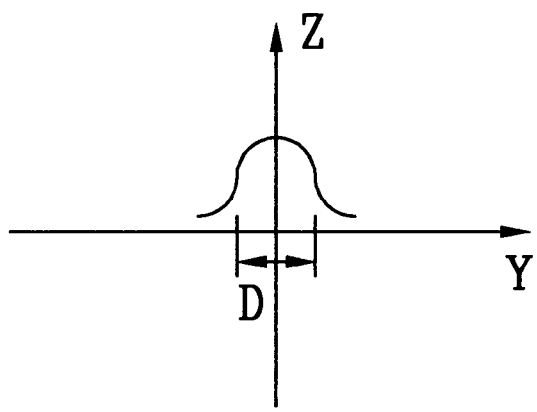

FIGS. 2a–2f are plan and sectional views showing the reflecting substrate of the present invention, where FIGS. 2c and 2e are sectional views taken along lines II–II' and II–III' of FIG. 2a, respectively. As shown in the figures, the reflecting substrate comprises a first substrate 10a, an insulating layer 11 having a convex-concave surface and formed on the first substrate 10a, and a metal layer 12 on the insulating layer 11. A continuous concave and convex surface of the metal layer 12 is obtained by the insulating layer 11 as one layer as shown in FIGS. 2c and 2e. As shown in FIG. 2b, the XY plane outline of the convex portion 11a and 11b includes two sides substantially parallel to the X axis, and two outwardly arcs connecting the ends of the two sides, and has a width in the X axis direction larger than a width in the Y axis direction. In FIG. 2b, F represents the length of each of the two straight sides, L represents the width in the X axis direction, and D represents the width in the Y axis direction. It is preferable to determine each size of L, D and F is in the range of 3 $\mu$m<L<10 $\mu$m, 2 $\mu$m<D<8 $\mu$m, and 0.5L<F<0.9 L. The surface of the convex portion 11a has a straight outline parallel to the X axis direction in the XZ plane as shown in FIG. 2d, and a round outline in the YZ plane as shown in FIG. 2e. It is possible that the XY plane outline of the convex portions 11a and 11b is an ellipse or oval form. IN this case, each width in the X and Y axis directions is preferable to be in the same range of L and D, respectively. The convex portions 11a and 11b have various sizes as shown in FIGS. 2a to prevent the light interference. It is preferable that the area of the convex portions are determined to occupy 20–70% of the pixel area, and distances S and T in the X and Y axis directions between adjacent convex portions as shown in FIG. 2a are determined to be in a range of 3 $\mu$m to 10 $\mu$m.

When light from a light source in +Y and +Z direction(e.g. at 30° incident angle) is incident on the convex surface of the conventional reflecting substrate, the brightness is low in the main viewing angle direction(–Y and +Z direction) of the user because a large amount of light is reflected into the different directions. However, when the light is incident on the convex surface of the reflecting substrate according to the present invention, the brightness increases in the main viewing angle direction(–Y and +Z direction) because of the shape of the convex surface.

The reflective-type LCD of the present invention is manufactured by the following processes. First, a photoresist layer is formed on the substrate 10a, and UV light is irradiated into the photoresist layer with a mask blocking the photoresist layer and having holes in the same plane form as the convex portions 11a and in 11b as shown in FIG. 2a. thereafter, the photoresist layer is partially developed and heat-treated to form the convex-concave layer having a continuous convex-concave surface as shown in FIGS. 2. At the moment, it is preferable that low decomposition material such as photo-sensitive acryl resin is used for the photoresist layer so that the photoresist layer may be partially developed, and then the continuous convex-concave surface can be obtained without forming an overcoat layer thereon. Thereafter, the metal layer 12 having a thickness of 100–300 nm is formed thereon by sputtering metal such as Al, Mo, and Al alloys.

Figure 3:
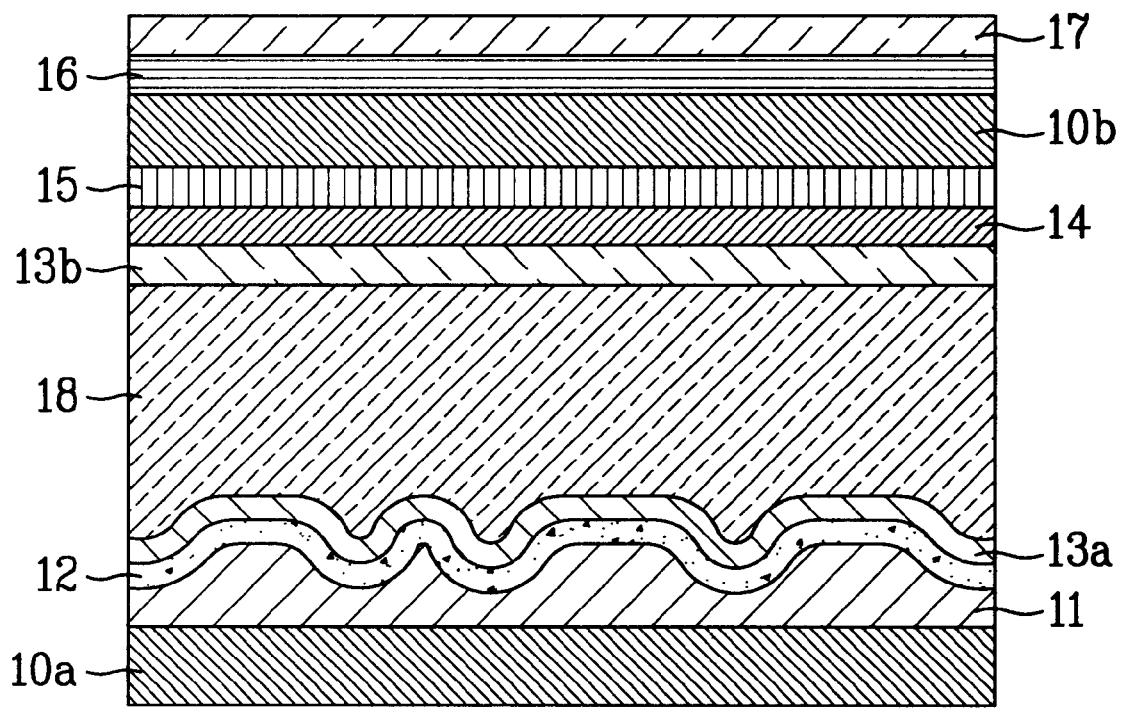
FIG. 3 is a sectional view showing a reflective-type LCD according to the present invention.

FIG. 3 is a view showing a liquid crystal display device according to the present invention. As shown in FIG. 3, the liquid crystal display device comprises first and second substrates 10a and 10b, an insulating layer 11 formed thereon and having a convex-concave surface, a metal layer 12 thereon, a first alignment layer 13a thereon, an optical film 15 on an upper surface of the second substrate 10b, a color filter layer 15 on a lower surface of the second substrate 10b, a transparent electrode 14 thereon, a second alignment layer thereon, and a liquid crystal layer between the two alignment layers 13a and 13b. Although not shown in the figure, the metal layer 12 is connected with a drain electrode of a thin film transistor formed in each of pixel regions, and functions as a pixel electrode and a reflector. The color filter includes red(R), green(G), and blue(B) color filter elements for full color display.

Figure 4:
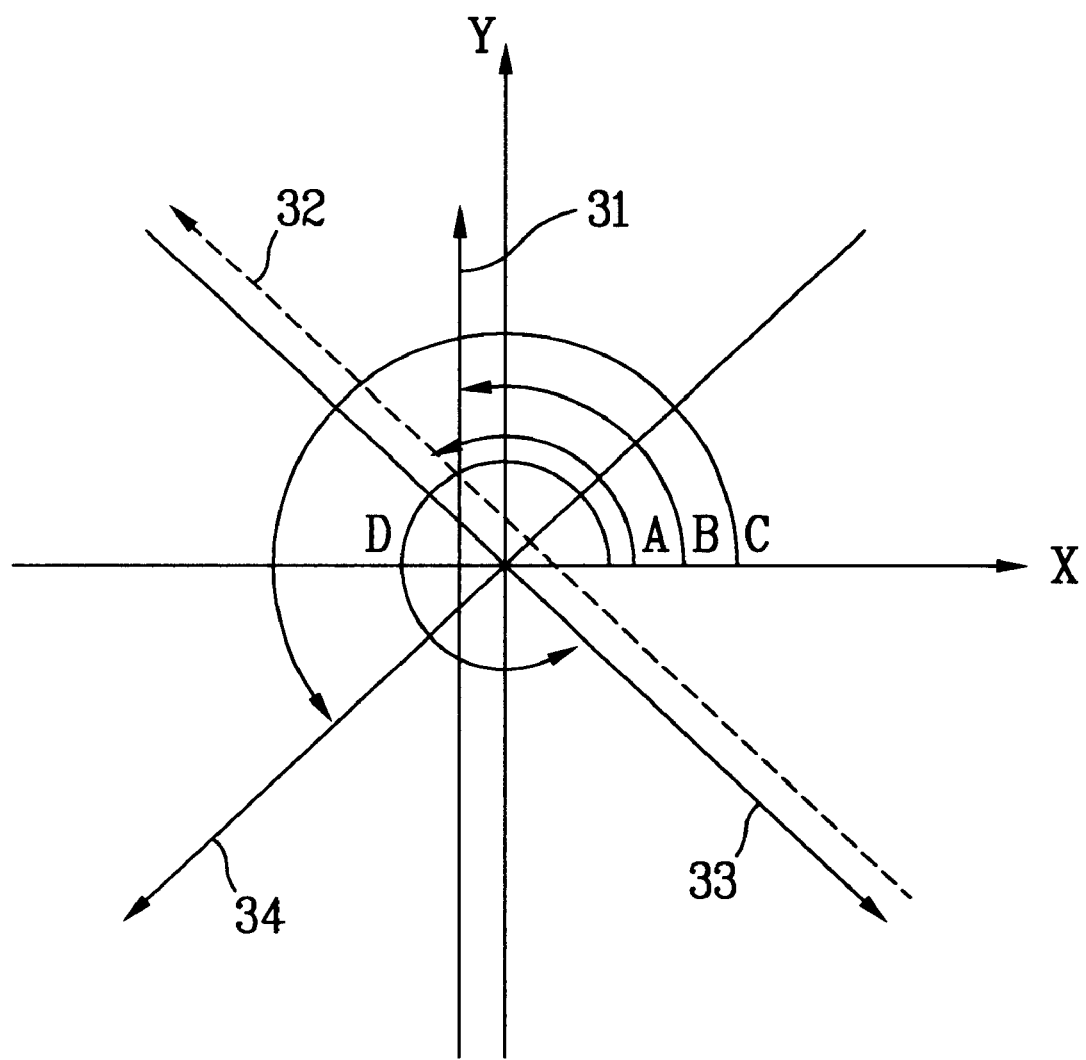
FIG. 4 is a view showing a polarization direction of a polarizer, first and second alignment directions, and a slow axis direction of an optical film in the reflective-type LCD of the present invention.

As shown in FIG. 4, a polarization axis 31 of the polarizer 17 is at an angle B, 90°, with respect to X axis, and a slow axis 32 of the optical film 16 is at an angle A, 135°, with respect to X axis. Two optical films can substitute for the optical film 16, where the average of two angles of each slow axis with respect to X axis is determined to be 135°. The optical film 16 imparts λ/4 or 130–150 nm phase retardation (Δnd) to the incident light whose wave length is about +550 nm. For this object, the slow axis 32 of the optical film 16 is determined to be at 45° or 135° with respect to X axis. In other words, angle between the slow axis 32 and the polarization direction 31 is determined to be at 45°. It is preferable that phase retardation (Δnd) of the liquid crystal layer 18 is determined to be in a range of 0.2 to 0.25 nm. A first alignment direction 33 of the first alignment layer 13a is at an angle C, 225°, with respect to the X axis, and a second alignment direction 34 of the second alignment layer 13b is at an angle D, 315°, with respect to the X axis. The two alignment directions determine the main viewing angle direction of the user as follows. An azimuth angle (the angle with respect to the X axis in the XY plane) of the main viewing angle direction is in a range of 225° (C) to 315° (D), and a polar angle (the angle with respect to Z) of the main viewing angle direction is in a range of 0° to 30°. Angle allowance of ±10° can be given to the angles A and B, respectively in condition that angle between the angles A and B is 45° or 135°. Further, angle allowance of ±20° can be given to the angles C and D, respectively. For improving the reflectance, it is preferable that the average transmittance of the color filter layer 18 is determined to be in a range of 55% to 75%. It is possible that an anti-reflective dielectric layer whose refractive index is in a range of 1.3 to 1.35 is coated on an outer surface of the polarizer 17 to reduce the reflectance of the surface of the polarizer 17.

Figure 5:
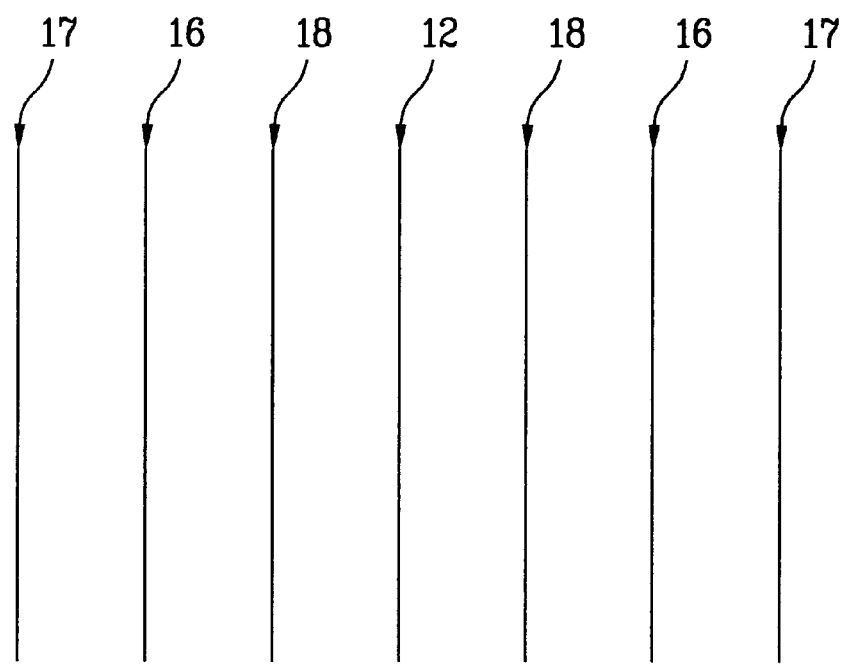
FIG. 5 is a view showing the polarization change of light in the reflective-type LCD according to the present invention.
Figure 5:
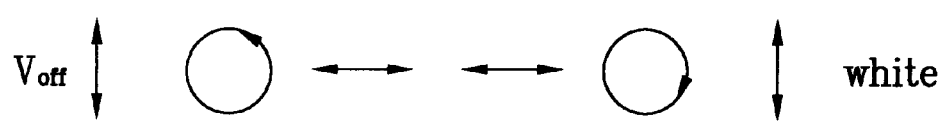
Figure 5:

FIG. 5 is a view showing the polarization change of light in the reflective-type LCD according to the present invention.

Figure 6A:
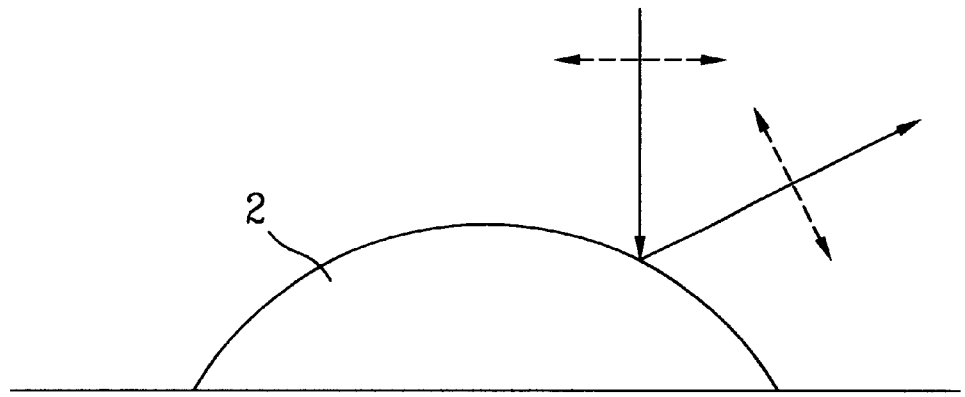
FIG. 6a is a view showing incident and reflected lights on a convex reflecting. surface of a reflecting substrate in the prior art.
Figure 6B:
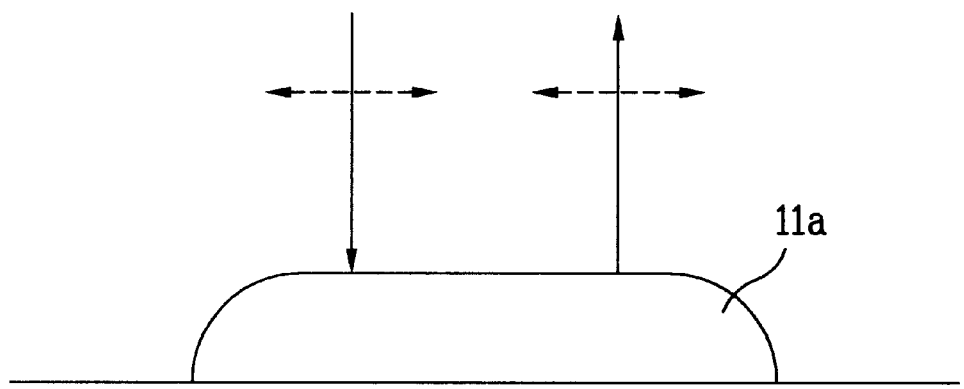
FIG. 6b is a view showing incident and reflected lights on a convex reflecting surface of a reflecting substrate in the present invention.

When voltage is not applied between the transparent electrode 14 and the metal layer 12, the incident light from a light source at +Y and +Z position is linearly polarized in Y axis direction parallel to the polarization direction of the polarizer 17, where the polarization direction is defined as a direction of electric field of the polarized light. Thereafter, the light is changed into left-handed circularly polarized light by the optical film. After passing the liquid crystal layer 18, the light becomes linearly polarized in X axis direction, and then the light is incident on the metal layer 12. Because the metal layer 12 has the convex-concave surface in form as shown in FIGS. 2, the luminance of reflected light increases in the main viewing angle direction which is in −Y and +Z direction. Further, as shown in FIG. 6b, because the incidence plane matches with the reflectance plane, the linear polarization direction is not changed after reflected on the metal layer 12, differently from the prior art. After reflected on the metal layer 12, the light passes through the liquid crystal layer 18, and is changed to a right-handed circularly polarized light. Thereafter, the light is linearly polarized in Y axis direction by the optical film 16, and then passes through the polarizer 17, representing the white state.

When voltage is applied between the transparent electrode 14 and the metal layer 12, the incident light from a light source at +Y and +Z position is linearly polarized in Y axis direction parallel to the polarization direction of the polarizer 17, and then is changed into left-handed circularly polarized light by the optical film. Thereafter the light passes through the liquid crystal layer 18 without any polarization change, and then the light is incident on the metal layer 12. After reflected on the metal layer 12, the light passes through the liquid crystal layer 18 without any polarization change. Thereafter, the light is linearly polarized in X axis direction by the optical film 16, and then is blocked by the polarizer 17, representing the black state.

Figure 7:
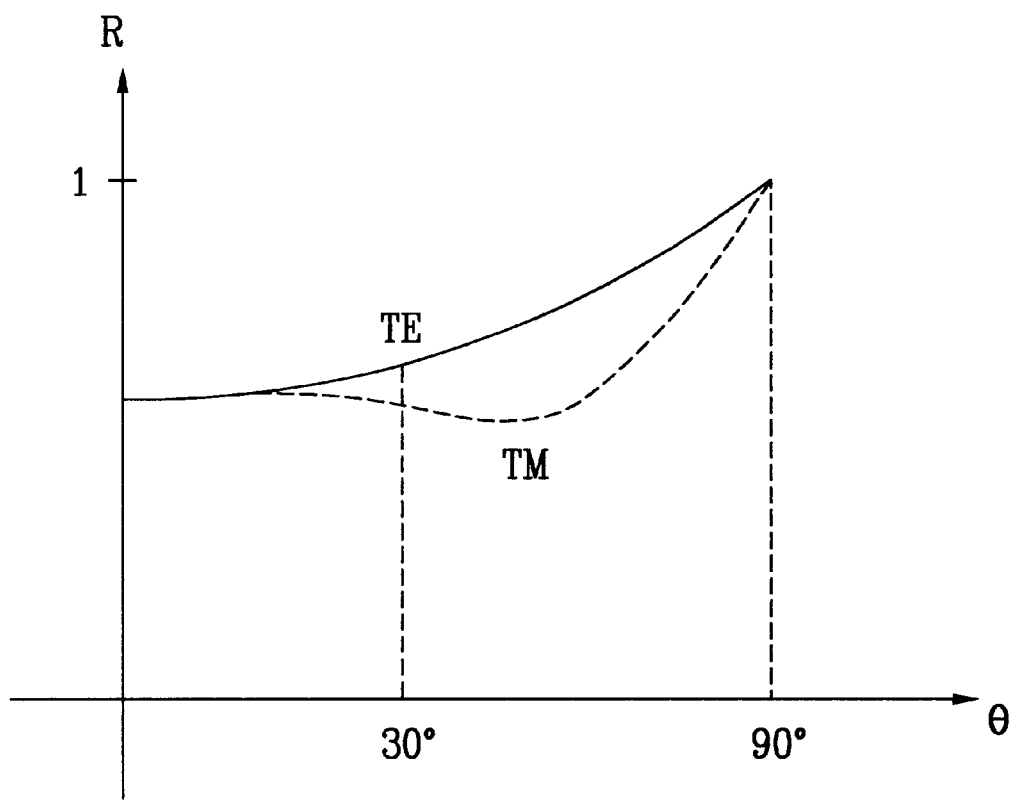
FIG. 7 is a graph showing the reflectance R of a typical metal layer with respect to the incident angle θ of TM(transverse magnetic) polarized light and TE(transverse electric) polarized lights.

FIG. 7 is a graph showing the reflectance R of a typical metal with respect to the incident angle θ of TM(transverse magnetic) polarized light and TE(transverse electric) polarized light. TM polarized light is defined as an incident light having magnetic field parallel to the surface of the metal layer, and TE polarized light is defined as an incident light having electric field parallel to the surface of the metal layer. As shown in FIG. 7, TE polarized light has a larger reflectance than TM polarized light in a wide range of the incident angle θ. Because the light is incident on the metal layer as TE polarized light in the present invention, the reflective luminance increases in all viewing angle direction.

The above-mentioned reflective-type LCD operates in normally white mode. Further, the present invention can be applied to a reflective-type LCD of normally black mode. In this case, the optical film is disposed to impart λ/2 phase retardation to the incident light. Furthermore, the present invention can be applied to another reflective-type LCD of normally black mode, where the polarization direction of the polarizer is disposed parallel to X axis without using the optical film. Also in this case, the light is incident on the metal layer as TE polarized light in this case, and then the reflective luminance increases in all viewing angle direction.

While the preferred forms of the present invention have been described, it is to be understood that modifications will be apparent to those skilled in the art without departing from the spirit of the invention. Therefore, the scope of the invention is to be determined solely by the following claims.

What is claimed:

1. A reflecting substrate of a reflective-type liquid crystal display device, comprising:
   a substrate parallel to first and second directions perpendicular to each other;
   an insulating layer having a convex-concave surface over the substrate, a convex portion thereof having a first outline in a plane parallel to the substrate, the first outline having a first width in the first direction and a second width in the second direction, the first width being larger than the second width, the convex portion having a straight outline in a plane perpendicular to the substrate and parallel to the first direction, and the convex portion having a round outline in a plane perpendicular to the substrate and parallel to the second direction; and
   a metal layer on the convex-concave surface of the insulating layer.

2. The device according to claim 1, wherein a surface of the insulating layer opposite to the convex-concave surface is flat.

3. The device according to claim 2, wherein the insulating layer includes a photo-sensitive acryl resin.

4. The device according to claim 1, wherein the first outline comprises two sides parallel to the first direction, and two outwardly rounded arcs connecting ends of the two sides.

5. The device according to claim 1, wherein the first width is in a range of 3 μm to 10 μm, and the second width is in a range of 2 μm to 8 μm.

6. The device according to claim 4, wherein each length of the two sides is in a range of 0.5 to 0.9 times as large as the first width.

7. The device according to claim 1, wherein the insulating layer has a plurality of convex portions, and a gap between two adjacent convex portions is in a range of 2 μm to 5 μm.

8. A reflecting substrate of a reflective-type liquid crystal display device, comprising:
   a substrate parallel to first and second directions perpendicular to each other;
   an insulating layer having a convex-concave surface over the substrate, a convex portion thereof having a first outline in a plane parallel to the substrate, the first outline having a first width in the first direction and a second width in the second direction, the first width being larger than the second width, the convex portion having a round outline in a plane perpendicular to the substrate and parallel to the second direction, and a surface of the insulating layer opposite to the convex-concave surface being flat; and
   a metal layer on the convex-concave surface of the insulating layer.

9. The device according to claim 8, wherein the first outline is in an oval form.

10. The device according to claim 9, wherein the first width is in a range of 3 μm to 10 μm.

11. The device according to claim 9, wherein the second width is in a range of 2 μm to 8 μm.

12. A reflective-type liquid crystal display device, comprising:
   first and second substrates parallel to first and second directions perpendicular to each other;
   an insulating layer having a convex-concave surface over the first substrate, a convex portion thereof having a first outline in a plane parallel to the substrate, the first outline having a first width in the first direction and a second width in the second direction, the first width being larger than the second width, the convex portion having a round outline in a plane perpendicular to the substrate and parallel to the second direction;
   a metal layer on the convex-concave surface of the insulating layer;
   a first alignment layer over the metal layer and having a first alignment direction;
   a polarizer over the second substrate and having a polarization direction parallel to the second direction;

an optical film for phase retardation of light over the second substrate, the optical film having a first slow axis and being at a position between the polarizer and first substrate;

a second alignment layer over the second substrate and having a second alignment direction; and a liquid crystal layer between the first and second alignment layers.

13. The device according to claim 12, wherein the first slow axis is at 45° with respect to the polarization direction.

14. The device according to claim 12, further comprising another optical film having a second slow axis over the second substrate, wherein an average of two angles of the two slow axises with respect to the first direction is 135°.

15. The device according to claim 12, wherein the first slow axis is in a range of 125° to 145° with respect to the first direction.

16. The device according to claim 12, wherein the optical film imparts $\lambda/4$ phase retardation to a visible light.

17. The device according to claim 12, wherein the optical film imparts $\lambda/2$ phase retardation to a visible light.

18. The device according to claim 12, wherein the first and second alignment directions are determined so that the second direction is in a main viewing angle direction of a user.

19. The device according to. claim 12, wherein the first alignment direction is at 225° with respect to the first direction, and the second alignment direction is at 315° with respect to the first direction.

20. The device according to claim 12, wherein the first alignment direction is in range of 205° to 245° with respect to the first direction, and the second alignment direction is in a range of 295° to 335° with respect to the first direction.

* * * * *